United States Patent

[11] 3,619,143

| [72] | Inventors | Angel Vian Ortuno;<br>Segundo Jimenez Gomez; Juan Javier Diaz Roncal, all of Madrid, Spain |
|---|---|---|
| [21] | Appl. No. | 818,452 |
| [22] | Filed | Apr. 22, 1969 |
| [45] | Patented | Nov. 9, 1971 |
| [73] | Assignee | Empresa Auxiliar De La Industria S. A.<br>Madrid, Spain |
| [32] | Priority | Apr. 23, 1968 |
| [33] | | Spain |
| [31] | | 353037 |

[54] PROCESS FOR THE PURIFICATION OF SULFUR FROM PYRITE AND OTHER SULFUR-CONTAINING ORES
17 Claims, No Drawings

[52] U.S. Cl. .................................................. 23/224, 23/229, 23/144
[51] Int. Cl. ........................................................ C01b 17/06
[50] Field of Search ............................................. 23/224, 229, 144

[56] References Cited

UNITED STATES PATENTS

| 1,952,290 | 3/1934 | Schopper ...................... | 23/144 |
| 1,970,147 | 8/1934 | Levy ............................. | 23/224 |
| 2,959,467 | 11/1960 | Yusuf et al. .................. | 23/144 |

FOREIGN PATENTS

| 25,444 | 11/1902 | Great Britain ................ | 23/144 |

*Primary Examiner*—Oscar R. Vertiz
*Assistant Examiner*—G. O. Peters
*Attorney*—Michael S. Striker

ABSTRACT: Arsenic sulfide is removed from sulfur by treatment with an acidic liquor containing an oxidizing agent, so that sulfuric acid and arsenic acid are formed and sulfur is obtained essentially pure. The process is very economical, because by using nitric acid in sulfuric acid, the nitrogen oxides formed may be oxidized with air, combined with water to regenerate nitric acid and the acidic liquor recycled.

PROCESS FOR THE PURIFICATION OF SULFUR FROM PYRITE AND OTHER SULFUR-CONTAINING ORES

This invention relates to a novel process for the purification of sulfur which is very economical and which proceeds with practically quantitative recovery.

In general, the processes known in the art for the extraction and purification of sulfur from natural ores, consist of applying heat so that sulfur volatilizes and the vapors are condensed. In the case of arsenical pyrite, however, the product contains a significant amount of arsenic, because the arsenical compounds present in this ore volatilize and later condense together with elementary sulfur. Manifestly, this process does not give pure sulfur. Moreover, other substances accompany arsenic in the ore, which are capable of volatilizing and their vapors condense together with sulfur. For instance, the sulfide of lead may volatilize and condense together with sulfur. Dust particles, which contain the sulfides of iron, zinc and copper, and impurities of the silicic acid type, are mechanically carried over during the volatilization step and are found together with the condensate.

Purification of the gaseous stream containing sulfur vapor has been conducted by electrostatic deposition. This method removes a substantial part of the sulfides or iron, copper and zinc, silicic dust and a small portion of lead sulfide. However, this method is not satisfactory for the removal of arsenic and the remainder of lead, which unavoidably volatilize and condense with sulfur. Chemical methods have been applied for the purification of sulfur at this stage, namely the arsenical compounds are brought into solution and the undissolved sulfur is filtered off. The lead sulfide, however, which has not been removed by electrostatic deposition, remains in the sulfur. Manifestly this chemical treatment is not very efficient because in addition to the fact that it does not remove all the lead sulfide, it requires dissolution of the arsenical compounds, that is the sulfide, in order to separate sulfur by filtration or other physical methods.

Other processes are known in the art for the purification of sulfur from arsenical compounds, but in general, they have little commercial value, because they require substantial amounts of reagents and the recovery of pure sulfur is relatively small. Another drawback is that arsenic, which is a valuable commercial substance, is left in an unusable form. One method, for instance, consists of adding during the filtration an adsorbent or a substance which reacts with arsenic sulfide, for instance, active earth, ferrous and ferric hydroxide. However, only small quantities of arsenic are removed by this method. Another drawback is that the regeneration of the absorbing agent is difficult.

Another process known in the art consists of reacting the sulfide of arsenic with alkaline reagents to form thiosalts, which are separable by filtration. Among the processes most commonly used in this category, is the "calcium thioarsenate process." Here the fused sulfur is treated with a leaching liquor containing calcium hydroxide, at a pressure of 2–3 atmospheres. Calcium thioarsenate is formed, together with calcium sulfate, polysulfide and other thionic compounds of calcium. Since these calcium salts are soluble, the sulfur may be decanted or filtered off. The chemical reaction may be represented as follows:

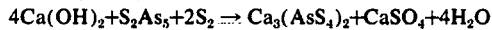

$4Ca(OH)_2 + S_2As_5 + 2S_2 \rightleftharpoons Ca_3(AsS_4)_2 + CaSO_4 + 4H_2O$

A mere glance at the equation above indicates that a mole of $CaSO_4$ is formed per each mole of calcium thioarsenate. This corresponds to 0.85 kg. of elementary sulfur being consumed as the thioarsenate and the calcium sulfate per kg of arsenic being converted into the thioarsenate. This is a substantial amount, particularly if one considers that the cost of sulfur today is high. Even more significant, a substance amount of sulfur is lost as calcium sulfide, because calcium oxide is little reactive as compared with the sulfide of arsenic, and the amount of calcium oxide used in actual practice must be much higher, specifically between 25 and 50 percent higher than the stoichiometric amount calculated from the equation above. In conclusion, the loss of sulfur is even greater than the amount specified above, that is, 0.85 kg. per kg. of arsenic.

Another substantial drawback of the process discussed above is that in view of the low reactivity of calcium hydroxide, the reaction requires between 2 and 3 hours. This long reaction time obviously immobilizes equipment and increases the cost. Still another disadvantage is that arsenic is obtained in a form which is practically unusable and therefore of little value. The calcium thioarsenate obtained by this process is also contaminated by other substances.

One object of this invention is to provide a process for the purification of sulfur which is superior to the other processes known in the art, because it is economical, free from the drawback of consumption of sulfur in the form of byproducts and which gives sulfur with practically quantitative recovery. Another object is to provide a process which does not require expensive reagents.

The crux of this invention resides in treating the sulfur which is to be purified, with aqueous acid leaching liquors and with a substance capable of serving as an oxidizing agent for arsenic sulfide. The reaction involving arsenic sulfide may be represented as follows:

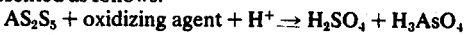

$AS_2S_5 + \text{oxidizing agent} + H^+ \rightleftharpoons H_2SO_4 + H_3AsO_4$

The arsenic sulfide is converted into arsenic acid and sulfuric acid. The sulfur which is purified according to the process of this invention may be either fused sulfur, which may or may not be filtered prior to treatment with the aqueous leaching liquors, or solid sulfur. The latter, however, is more expensive, because it must be pulverized and requires a longer reaction time.

Many substances may be used as the oxidizing agents, such as alkaline and alkaline-earch hypochlorites, chlorine, alkaline nitrates, nitric acid and mixtures of these substances with alkaline and alkaline-earch chlorides, hydrochloric acid or sulfuric acid.

If the boiling point of the acid solution containing the oxidizing agent is lower then the melting point of sulfur, the reaction must be conducted under pressure. On the other hand, it is possible to operate at normal pressure, with liquid sulfur, if the oxidizing agent and the acid liquor are so selected that the boiling point of the solution is higher than the melting point of sulfur.

According to a preferred embodiment of the invention, nitric acid is used as the oxidizing agent in combination with aqueous solutions of sulfuric acid. The advantage is that cationic compounds of nitrogen, of formula $NO_2^+$ are formed, which make the nitric acid solution more reactive than a solution of nitric acid of equal concentration. Although this invention is not to be limited by theoretical explanations it is believed that sulfuric acid acts as a promoter for the reaction of $As_2S_5$, so that the velocity of the reaction increases. The reaction time is shorter than when the reaction is conducted with aqueous or aqueous-saline solutions of nitric acid of similar concentration.

When nitric acid is used, the reaction may be represented as follows:

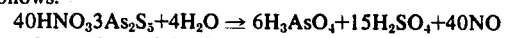

$40HNO_3 + 3As_2S_5 + 4H_2O \rightleftharpoons 6H_3AsO_4 + 15H_2SO_4 + 40NO$

Another substantial advantage is that nitric oxide vapors formed as a byproduct, may be completely recovered, for instance by air oxidation and the product absorbed in water, or an acid liquor, may then be recycled. Thus, although 5.6 kg. of nitric acid are required per kg. of arsenic, this is not a waste because the substance is totally recovered. The cost of the process according to this invention is very low, because the only other required reagents are air for the oxidation of nitric oxide and water used in the reaction in which $As_2S_5$ is converted into $H_2SO_4$ and $H_3AsO_4$. Water or the acidic leaching liquor is also needed to regenerate nitric acid.

Another substantial advantage of the process according to this invention is that it may be conducted continuously. In actual practice, sulfur is heated in a reactor until it melts in the presence of water, sulfuric acid and nitric acid. The oxides of nitrogen which are evolved are oxidized by air and then absorbed in about 1 part of the acid leaching liquor. This advantageously mixed with water and then recycled. A column is a suitable device for the absorption by the acid leaching liquor.

The sulfur which is present as fused sulfur after the reaction in the form of a suspension in the acid leaching liquor, is separated from the liquid by decantation. Part of the acid leaching liquor is then recycled to the first reactor for treatment of additional arsenic sulfide, while the remainder is freed of the nitric oxide, cooled with air, and added to the vessel, usually a column, where the nitric oxide is oxidized with air and converted again into nitric acid.

Manifestly, the only reagents which are used up in the process in accordance with the present invention, are water and air, because the nitric acid and the sulfuric acid are recycled.

The process in accordance with the present invention, is very efficient and the concentration of arsenic acid in the leaching liquor may be high without diminishing the effectiveness of the process. The removal of arsenic from sulfur is effectively carried out until only 20–50 parts per million of arsenic remain, with a leaching liquor which may contain 200–300 kg. of arsenic per cubic meter.

The fused sulfur which is decanted off, is then purified in known fashion, that is, is washed with water vapors, to remove residual acids, allowed to solidify and converted into the ordinary forms of commerce.

The process in accordance with this invention may be applied also to fuses sulfur, without the preliminary filtration. In this case, when sulfur and arsenic sulfide contain other contaminants, for instance, sulfurous residues. The sulfurous residues are dissolved in the acid leaching liquor, while the insoluble contaminants remain in the liquor in suspension. In this case, the leaching liquor requires an additional filtration before recycling. The insoluble contaminants are not obtained ordinarily in such a form that they can be utilized, but the sulfur is obtained in a high degree of purity, essentially just as pure as the sulfur obtained when the original sulfur is filtered. Manifestly the embodiment according to which the condensed sulfur before treatment with nitric acid and sulfuric acid is filtered, is to be preferred, because the only contaminant present at that stage is the sulfide of arsenic Moreover the residue from the initial filtration may be recovered and reused in the thermal treatment for the production of sulfur. The additional filtration of the leaching liquor which contains arsenic acid and sulfuric acid, is not necessary, if the condensed sulfur is filtered, at the beginning of the process.

The temperature for the reaction with the oxidizing agent and the acid may be as low as 70°–80° C. and even higher than 160° C. It is preferable, however, to operate in the range of 110°–160° C., and even better in the range of 125°–140° C. The selection of the proper temperature range requires the proper balance between removal of arsenic as effectively as possible and keeping the loss of elementary sulfur to a minimum. At low temperature, lower than 110° C., for instance 70°–80° C., solid sulfur is present which presents the difficulties discussed hereinabove. At temperatures higher than 160° C., the viscosity of sulfur increases and this makes the handling of the suspension more difficult. Another drawback, if the reaction is conducted at a temperature higher than 160° C., is that elementary sulfur is lost mainly by combustion.

The proportion of sulfuric acid in the aqueous leaching liquor, before the addition of the oxidizing agent, may be varied within a broad range, namely $H_2SO_4:H_2O$ may be between 50 and 100 percent by weight. According to the best embodiment of the invention, however, the ratio $H_2SO_4: H_2O$ is 60–75 percent of sulfuric acid because, at low concentration, the leaching liquor is less reactive and at high concentration, loss of elementary sulfur by combustion occurs. At high concentration, however, the reaction of $As_2S_5$ is favored.

The concentration of the oxidizing agent in the leaching liquor depends on the arsenic content of the original sulfur and on the proportion sulfur: leaching liquor in the reactor, where arsenic is removed. If the oxidizing agent is nitric acid, which is the preferred reagent, the concentration of nitric acid in the leaching liquor may vary between 1 and 8 percent by weight, and is preferably between 1.75 and 2.5 percent.

The ratio of the weight of sulfur to the volume of the reactive leaching liquor may be varied between 1:1 and 1:8, preferably between 1:2 and 1:4. Needless to say, the total quantity of the oxidizing agent should be at least in the stoichiometric amount according to the equation above for the reaction of oxidation of $As_2S_3$ to sulfuric acid and arsenic acid.

At the temperature at which the process is carried out, the chemical reaction involved for the dissolution of arsenic sulfide is very rapid, but the overall rate of the process depends upon the rate of fusion of the sulfide of arsenic in the liquid sulfur. If the vessel in which the liquid sulfur is located is kept under sufficient mechanical agitation, the liquid sulfur is kept dispersed in the leaching liquor, and the residence time varies between 10 and 30 minutes, preferably between 15 and 20 minutes. The invention is further illustrated by the following example.

EXAMPLE M1.

A sample of sulfur from the natural ore of pyrite was used, which had the following composition:

| | |
|---|---|
| Total sulfur (elementary + combined) | 93.71% |
| Arsenic | 1.97% |
| Lead | 0.71% |
| Iron | 2.37% |
| Copper | 0.05% |
| Zinc | 0.14% |
| Insoluble in acids | 1.05% |
| Total | 100.00 |

After filtration, the composition was:

| | |
|---|---|
| S total | 97.60% |
| As | 2.40 |
| Total | 100.00 |

The material was washed for a period of 20 minutes, at 125° C., with a leaching liquor previously used for the dissolution of $As_2S_5$, which had the following composition:

| | |
|---|---|
| $H_2SO_4$ | 50.7% |
| $H_3AsO_4$ | 25.1 |
| $H_2O$ | 22.2 |
| $HNO_3$ | 2 |
| Total | 100.00 |

The ratio of the weight of sulfur to the volume of leaching liquor was 1:4. The sulfur was then separated from the leaching liquor by decantation. After washing with water vapor, the arsenic content was 20 parts per million. The recovery of sulfur was 99.9 percent.

The leading liquor was then treated to remove the sulfuric acid and the arsenic acid present and was then ready for recycling.

Although only one example has been described in detail, those skilled in the art will readily appreciate that variations may be made, without departing from the spirit of the invention, which is to be limited only by the scope of the appended claims.

What is claimed is:

1. A process for the purification of sulfur from sulfur-containing ores wherein sulfur is contaminated by arsenic, the latter being in the form of the sulfide which comprises subjecting said sulfur to the action of an aqueous acidic liquor in the presence of a substance which is an oxidizing agent for the sulfide of arsenic, whereby arsenic sulfide is converted into water-soluble sulfuric acid and arsenic acid, separating the sulfur from the aqueous liquor by decantation, and washing the sulfur with water, whereby sulfur of high purity is obtained and the arsenic content does not exceed 50 parts per million of sulfur.

2. The process according to claim 1 which is conducted continuously and the acidic aqueous liquor is recycled.

3. The process according to claim 1 wherein the sulfur being subjected to the action of the acidic liquor containing the oxidizing agent is liquid sulfur.

4. The process according to claim 1 wherein the sulfur being subjected to the action of the acidic liquor and oxidizing agent is finely divided solid sulfur.

5. The process according to claim 1 wherein the sulfur from the natural ore contains contaminants of lead, copper, zinc and the sulfur is filtered before subjecting it to the action of the acidic liquor containing the oxidizing agent, whereby the contaminants are removed and the sulfur being subjected to the action of the acidic liquor contains only arsenic sulfide.

6. The process according to claim 1 wherein the oxidizing agent is a member selected from the group consisting of alkaline and alkaline-earth hypochlorites, aqueous solution of chlorine, nitrogen oxides, alkaline nitrates, nitric acid and mixtures thereof, in an aqueous solution of alkaline and alkaline-earth chlorides, hydrochloric acid or sulfuric acid.

7. The process according to claim 6 wherein the oxidizing agent is nitric acid and the reaction is effected in the presence of water and sulfuric acid, nitric oxide is formed; the latter is oxidized and combined with the acidic liquor or water to regenerate nitric acid, and the nitric acid is recycled.

8. The process according to claim 1 wherein the temperature is between 110° C. and 160° C.

9. The process according to claim 1 wherein the temperature is between 125° C. and 140° C.

10. The process according to claim 7 wherein the concentration of nitric acid in the aqueous acidic liquor is between 1 and 8 percent by weight.

11. The process according to claim 10 wherein the concentration of nitric acid in the aqueous acidic liquor is between 1.75 and 2.5 percent.

12. The process according to claim 1 wherein the ratio of the weight of sulfur to the volume of the aqueous acidic liquor containing the oxidizing agent is between 1:1 and 1:8.

13. The process according to claim 12 wherein the ratio is between 1:2 and 1:4.

14. The process according to claim 7 wherein the proportion of sulfuric acid with respect to water in the acidic aqueous liquor is between 50 and 100 percent.

15. The process according to claim 14 wherein the proportion of sulfuric acid with respect to water in the acidic liquor is between 60 and 75 percent.

16. The process according to claim 1 which is conducted at a temperature lower than the boiling point of the acidic liquor containing the oxidizing agent and the melting point of sulfur is lower than the boiling point of said liquor, and the pressure is atmospheric pressure.

17. The process according to claim 1 wherein the melting point of sulfur is higher than the boiling point of said acidic liquor containing the oxidizing agent, and the process is conducted at a pressure higher than atmospheric pressure.

* * * * *